3,694,188
THERMAL DECOMPOSITION OF IRON CARBONYL
David Myers Llewelyn, Clydach, Swansea, Wales, assignor to The International Nickel Company, Inc., New York, N.Y.
No Drawing. Filed July 2, 1971, Ser. No. 159,474
Claims priority, application Great Britain, July 7, 1970, 32,960/70
Int. Cl. B22f 9/00
U.S. Cl. 75—.5 AA 10 Claims

ABSTRACT OF THE DISCLOSURE

The carbon content of iron powder formed by the thermal decomposition of iron carbonyl is lowered and the rate of conversion of iron carbonyl to carbonyl iron is increased by carrying out the reaction at a temperature of at least about 270° C. in the presence of nitrous oxide ($N_2O$).

---

The present invention relates to the production of metal powder and more particularly to the production of metallic iron by the thermal decomposition of iron carbonyl vapour.

The thermal decomposition of iron-carbonyl can be done in various ways. Thus, decomposition of iron carbonyl in the hot free space of a decomposer leads to the formation of iron powder having variously shaped particles according to the conditions used. Another process is to decompose the carbonyl on the surface of hot solid particles, which may be of iron powder or of other materials that are to be coated with iron, in the form of a fluidized bed or a suspension of powder in a carbonyl containing gas.

Iron formed by the thermal decomposition of iron carbonyl contains substantial amounts of carbon. It is believed that at least some of the carbon is produced by the disproportionation of carbon monoxide according to the reaction:

$$2CO \rightarrow CO_2 + C$$ 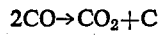

The production of carbon according to this reaction becomes more pronounced with increasing temperatures, and carbonyl iron produced at increasing temperatures contains increasing amounts of carbon.

When carbonyl iron powder is produced by decomposing iron carbonyl in the hot free space of a reactor, the problem of carbon production is particularly noticeable. In most instances, the free space of the reactor is heated through the reactor walls and to maintain the free space at decomposition temperatures requires that the walls be heated to much higher temperatures, promoting the production of carbon at the reactor walls which carbon is eventually incorporated in the powder.

It has now been discovered that iron carbonyl can be thermally decomposed in the presence of nitrous oxide to produce carbonyl iron with low carbon contents.

It is an object of the present invention to provide a process for thermally decomposing iron carbonyl.

Another object of the invention is to provide a process for producing carbonyl iron powder with low carbon contents.

The invention also contemplates providing a process for thermally decomposing iron carbonyl in the hot free space of a reactor to provide carbonyl iron powder with low carbon contents.

It is a further object of the invention to provide a process for thermally decomposing iron carbonyl in a fluid bed reactor to provide carbonyl iron powder with low carbon content at high production rates.

The invention further contemplates providing a process for thermally decomposing iron carbonyl in the hot free space of a reactor to provide carbonyl iron powder with low carbon contents at high production rates.

Other objects and advantages will become apparent from the following description.

Generally speaking, the present invention contemplates an improved process for thermally decomposing iron carbonyl contained in an iron-carbonyl-containing gas in the presence of nitrous oxide in small but effective amounts to increase the rate of iron carbonyl decomposition to metallic iron.

Iron carbonyl can be thermally decomposed at temperatures as low as about 230° C. and at temperatures as high as about 310° C. or higher. At temperatures below about 230° C. the rate of decomposition is so slow as to be commercially impractical while at temperatures much higher than about 310° C., the carbonyl iron powder has a very low bulk density and has a filamentary form.

Nitrous oxide is effective in increasing the rate of thermal decomposition of iron carbonyl even at temperatures as low as about 230° C.

For the nitrous oxide to be effective in producing carbonyl iron with low carbon contents, the temperature should be at least about 270° C. and preferably at least about 290° C. Only small amounts of nitrous oxide are required. As little as about 0.3% by volume has been found to be effective, and the amount can be even smaller, e.g., about 0.1%. It is to be noted that all gaseous compositions given herein are on a volumetric basis while solid compositions are given on a weight basis.

When the decomposition is carried out in the hot free space of a decomposer to form iron powder, the presence of nitrous oxide increases the particle size of the powder produced, and introduces very little nitrogen into the powder.

The effects of nitrous oxide on the thermal decomposition of iron carbonyl are illustrated by the results of tests carried out in a laboratory decomposer 10 inches in diameter, having mild-steel walls that are externally heated in use. In all the tests iron carbonyl vapour diluted with carbon monoxide to give a carbonyl concentration of 60% by volume was introduced through an inlet at the top at a rate of 250 litres/hour of the gas mixture (i.e., 150 litres/hour of carbonyl vapour). The nitrous oxide, when used, was injected into the gas stream at a measured rate at room temperature. The temperature of the inlet to the decomposer was maintained at about 110° C. by air-cooling, and the temperature within the decomposer was measured mid-way between the axis and the wall and heating was carried out so as to maintain this temperature uniform in the region from 1 foot to 3 feet below the top of the decomposer.

In the tests, decomposer temperatures of 260° C., 290° C. and 310° C. were used and the concentration of the nitrous oxide was varied. Table I below shows the decomposer temperature, the concentration of the nitrous oxide by volume, the particle size of the powder as measured in the Fisher sub-sieve sizer, the tapped density of the powder and its carbon contents. The nitrogen content of each of the powders was less than 0.005%, and they were in the form of discrete particles. Tests A to G are given by way of comparison. In Tests A, B, and C no addition of nitrous oxide was made, and in Tests D to G the temperature was too low to produce carbonyl iron powder with low carbon contents.

TABLE I

| Test No. | Temp. (° C.) | $N_2O$ concentration (percent) | Fisher size (microns) | Taped density (g./cc.) | C (percent) |
|---|---|---|---|---|---|
| A | 260 | | 8.1 | 4.31 | 0.62 |
| D | 260 | 0.1 | 7.6 | 4.32 | 0.72 |
| E | 260 | 1.0 | 7.58 | 4.30 | 0.67 |
| F | 260 | 5.0 | 8.20 | 4.36 | 0.81 |
| G | 260 | 10.0 | 7.58 | 4.35 | 0.90 |
| B | 290 | | 4.92 | 3.92 | 0.91 |
| 1 | 290 | 1.0 | 6.26 | 4.20 | 0.68 |
| 2 | 290 | 5.0 | 5.66 | 4.21 | 0.83 |
| C | 310 | | 3.9 | 3.3 | 1.03 |
| 3 | 310 | 1.0 | 4.5 | 4.13 | 0.75 |
| 4 | 310 | 5.0 | 4.8 | 4.22 | 0.74 |

To determine the effect of nitrous oxide under other decomposition conditions, tests were carried out in which a mixture of iron carbonyl vapour and carbon monoxide, with and without the addition of nitrous oxide, was blown into the bottom of a bed of iron powder in a fluidized bed decomposer so as to fluidize the bed. The decomposer consisted of a steel vessel 3 inches in diameter, externally heated by means of electrical heating coils, and the gas mixture was introduced at a rate of 3.5 cubic metres per hour at a temperature of 160° C. The initial weight of the bed was 2.5 kg., and it was heated by means of the heating coils to a constant temperature. The iron carbonyl in the inlet gases was decomposed both on the existing particles of iron powder and with the formation of new particles, with the result that the weight of the bed progressively increased.

At each temperature the concentration of iron carbonyl in the inlet gases and the rate of heat input were varied so as to obtain the maximum rate at which the carbonyl was completely decomposed as it passed through the bed. Table II sets forth, for each of three temperatures, these maximum rates of deposition of iron without and with the addition of nitrous oxide, and the carbon content of the iron deposited. Tests H to L are given by way of comparison.

TABLE II

| Test No. | Temp. (° C.) | $N_2O$ concentration (percent) | Max rate of Fe deposition (kg./hr.) | C (percent) |
|---|---|---|---|---|
| H | 250 | | 0.59 | 1.74 |
| J | 250 | 0.3 | 0.70 | 1.84 |
| K | 270 | | 0.67 | 1.6 |
| 5 | 270 | 0.3 | 1.02 | 1.36 |
| 6 | 270 | 1.0 | 1.17 | 1.26 |
| L | 290 | | 1.63 | 1.12 |
| 7 | 290 | 0.3 | ¹ 2.08 | 1.02 |

¹ Maximum limited by rate of heat input.

It will be seen that at 250° C. no reduction in the carbon content was obtained, although the deposition rate was increased while at 270° C. and 290° C. the carbon content of the iron deposited in the presence of nitrous oxide was less than in its absence. At all temperatures iron carbonyl was decomposed at an increased rate when nitrous oxide was present.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. An improved process for decomposing iron carbonyl to produce metallic iron which comprises thermally decomposing iron carbonyl contained in an iron-carbonyl-containing gas in the presence of nitrous oxide in small but effective amounts to increase the rate of iron carbonyl decomposition to metallic iron.

2. The improved process as described in claim 1 wherein iron carbonyl is decomposed at a temperature of at least about 230° C.

3. The improved process as described in claim 1 wherein the iron carbonyl is decomposed at a temperature of at least about 230° C.

4. The improved process as described in claim 1 wherein iron carbonyl is decomposed at a temperature of at least about 270° C. and the nitrous oxide is effective in producing carbonyl iron with lower carbon contents.

5. The improved process as described in claim 4 wherein iron carbonyl is decomposed at a temperature below 310° C.

6. The improved process as described in claim 4 wherein the nitrous oxide is added to the iron-carbonyl-containing gas in an amount of at least about 0.1%.

7. The improved process as described in claim 4 wherein the nitrous oxide is added to the iron-carbonyl-containing gas in an amount of at least about 0.3%.

8. The improved process as described in claim 4 wherein the nitrous oxide is added to the iron-carbonyl-containing gas in amounts between about 0.1% and 10%.

9. The improved process as described in claim 8 wherein the iron carbonyl is decomposed in the hot free space of a reactor.

10. The improved process as described in claim 2 wherein the iron-carbonyl-containing gas is fed to a fluidized bed of heated particles and nitrous oxide is added to the iron-carbonyl-containing as in amounts between about 0.1% and 10% to increase the rate of metallic iron deposition on the heated particles by decomposition of iron carbonyl.

References Cited

UNITED STATES PATENTS 2,844,456   7/1958   Llewelyn   75—0.5 AA

WAYLAND W. STALLARD, Primary Examiner